United States Patent
Zhao et al.

(10) Patent No.: US 12,301,905 B2
(45) Date of Patent: May 13, 2025

(54) LIVESTREAMING DATA PROCESSING METHOD, APPARATUS AND DEVICE

(71) Applicant: Beijing Zitiao Network Technology Co., Ltd., Beijing (CN)

(72) Inventors: Shijie Zhao, Beijing (CN); Zirui Liu, Beijing (CN); Fugui Huang, Beijing (CN); Weiwang Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/395,345

(22) Filed: Dec. 22, 2023

(65) Prior Publication Data

US 2024/0205480 A1 Jun. 20, 2024

Related U.S. Application Data

(63) Continuation of application No. PCT/CN2022/116920, filed on Sep. 2, 2022.

(30) Foreign Application Priority Data

Sep. 3, 2021 (CN) .......................... 202111032741.4

(51) Int. Cl.
*H04N 21/258* (2011.01)
*H04N 21/2187* (2011.01)
(Continued)

(52) U.S. Cl.
CPC ... *H04N 21/25866* (2013.01); *H04N 21/2187* (2013.01); *H04N 21/4784* (2013.01); *H04N 21/4788* (2013.01); *H04N 21/4781* (2013.01)

(58) Field of Classification Search
CPC ......... H04N 21/25866; H04N 21/2187; H04N 21/4784; H04N 21/4788; H04N 21/4781
See application file for complete search history.

(56) References Cited

U.S. PATENT DOCUMENTS

2016/0286275 A1 9/2016 Maeda et al.
2020/0404219 A1 12/2020 Yerli
(Continued)

FOREIGN PATENT DOCUMENTS

CN 105765620 A 7/2016
CN 105872830 A 8/2016
(Continued)

OTHER PUBLICATIONS

International Patent Application No. PCT/CN2022/116920; Int'l Search Report; dated Dec. 7, 2022; 3 pages.
(Continued)

*Primary Examiner* — Alazar Tilahun
(74) *Attorney, Agent, or Firm* — BakerHostetler

(57) ABSTRACT

Embodiments of the present disclosure provide a livestreaming data processing method and apparatus, and a device. The method comprises: determining historical contribution values of a plurality of users viewing first livestreaming; if the historical contribution values of at least two of the plurality of users are greater than or equal to a first threshold, displaying a preset object in a livestreaming page of the first livestreaming; obtaining real-time contribution values of the plurality of users to the first livestreaming; and if it is determined, according to the real-time contribution values of the plurality of users to the first livestreaming, that there is a target user in the plurality of users, determining an owner of the preset object as the target user, the real-time contribution value of the target user to the first livestreaming being greater than or equal to an object contribution value corresponding to the preset object.

20 Claims, 12 Drawing Sheets

(51) Int. Cl.
*H04N 21/478* (2011.01)
*H04N 21/4784* (2011.01)
*H04N 21/4788* (2011.01)

(56) References Cited

U.S. PATENT DOCUMENTS

2022/0385996 A1* 12/2022 Lan .................. H04L 65/61
2023/0043174 A1* 2/2023 Zhang ............... H04N 21/4788

FOREIGN PATENT DOCUMENTS

| | | | |
|---|---|---|---|
| CN | 106028170 | A | 10/2016 |
| CN | 106507208 | A | 3/2017 |
| CN | 108076387 | A | 5/2018 |
| CN | 108419140 | A | 8/2018 |
| CN | 108600849 | A | 9/2018 |
| CN | 108712663 | A | 10/2018 |
| CN | 108848393 | A | 11/2018 |
| CN | 109246452 | A | 1/2019 |
| CN | 109275037 | A | 1/2019 |
| CN | 109348261 | A | 2/2019 |
| CN | 110475132 | A | 11/2019 |
| CN | 110944229 | A | 3/2020 |
| CN | 111107342 | A | 5/2020 |
| CN | 111182318 | A | 5/2020 |
| CN | 111212314 | A | 5/2020 |
| CN | 111629224 | A | 9/2020 |
| CN | 112637628 | A | 4/2021 |
| CN | 113055692 | A | 6/2021 |
| CN | 113225578 | A | 8/2021 |
| CN | 115767145 | B | 8/2024 |
| JP | 2015090526 | A | 5/2015 |
| JP | 2019022072 | A | 2/2019 |
| JP | 2020171005 | A | 10/2020 |
| JP | 2021018501 | A | 2/2021 |
| JP | 2021-071963 | A | 5/2021 |

OTHER PUBLICATIONS

European Patent Application No. 22863646.0; Extended Search Report; dated Jul. 25, 2024; 8 pages.
Notice of Reasons for Refusal for Japanese Application No. 2023-579599, mailed Oct. 29, 2024, 12 pages.
Written Opinion for International Application No. PCT/CN2022/116920, mailed Dec. 7, 2022, 9 Pages.
Notice of Reasons for Refusal for Japanese Application No. 2023-579599, mailed Feb. 18, 2025, 8 pages.

* cited by examiner

| History contribution record | | |
|---|---|---|
| Anchor A | Livestreaming of beauty makeup | 300 contribution values |
| Anchor B | Livestreaming of outdoor recreation | 200 contribution values |
| Anchor C | Livestreaming of games | 1000 contribution values |

Fig. 6

LIVESTREAMING DATA PROCESSING METHOD, APPARATUS AND DEVICE

CROSS-REFERENCE OF RELATED APPLICATIONS

This application is a Continuation Application of International Patent Application No. PCT/CN2022/116920, filed Sep. 2, 2022, which claims priority to Chinese Application No. 202111032741.4, filed on Sep. 3, 2021, the disclosures of which are incorporated herein by reference in their entireties.

FIELD

Embodiments of the present disclosure relate to the field of data processing technology, and more specifically, to a method, apparatus and device for processing livestreaming data.

BACKGROUND

During livestreaming, an anchor may interact with users to increase activity of the live room. For example, the users may interact with the anchor by posting bullet comments and sending gifts etc.

At present, the server may start a preset activity in the live room of the anchor to increase interactions between the anchor and the users. For example, if the contribution value in the live room of the anchor within one day is greater than a preset value, a bonus activity may be started in the live room of the anchor at scheduled time the next day.

SUMMARY

Embodiments of the present disclosure provide a method for processing livestreaming data, an apparatus and a device for addressing the technical solution about unsatisfactory effects achieved by opening a preset activity in the live room in the prior art.

In a first aspect, embodiments of the present disclosure provide a method for processing livestreaming data, comprising: determining history contribution values of a plurality of users watching a first livestreaming; displaying, if at least two of the plurality of users have history contribution values greater than or equal to a first threshold, a preset object in a livestreaming interface of the first livestreaming; obtaining real-time contribution values of the plurality of users to the first livestreaming; and determining, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object.

In a second aspect, embodiments of the present disclosure provide an apparatus for processing livestreaming data, comprising a first determination module, a display module, an obtaining module and a second determination module, wherein: the first determination module is configured to determine history contribution values of a plurality of users watching a first livestreaming; the display module is configured to display, if at least two of the plurality of users have history contribution values greater than or equal to a first threshold, a preset object in a livestreaming interface of the first livestreaming; the obtaining module is configured to obtain real-time contribution values of the plurality of users to the first livestreaming; and the second determination module is configured to determine, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object.

In a third aspect, embodiments of the present disclosure provide an electronic device comprising: a processor and a memory; where the memory stores computer-executable instructions; the processor executes the computer-executable instructions stored in the memory, so as to perform the method for processing livestreaming data according to the above first aspect and various possible designs of the first aspect.

In a fourth aspect, embodiments of the present disclosure provide a computer-readable storage medium having computer-executable instructions stored thereon which, when executed by a processor, implement the method for processing livestreaming data according to the above first aspect and various possible designs of the first aspect.

In a fifth aspect, embodiments of the present disclosure provide a computer program product comprising a computer program which, when executed by a processor, implements the method for processing livestreaming data according to the above first aspect and various possible designs of the first aspect.

In a sixth aspect, embodiments of the present disclosure provide a computer program which, when executed by a processor, implements the method for processing livestreaming data according to the above first aspect and various possible designs of the first aspect.

BRIEF DESCRIPTION OF THE DRAWINGS

Brief introduction of the drawings required in the description of the embodiments or the related prior art are to be provided below to more clearly explain the technical solutions according to the embodiments of the present disclosure or in the prior art. It is obvious that the following drawings illustrate some embodiments of the present disclosure and those skilled in the art also may obtain other drawings on the basis those illustrated ones without any exercises of inventive work.

FIG. 6 illustrates a schematic diagram of the history contribution record of the user provided by the embodiments of the present disclosure;

DETAILED DESCRIPTION OF EMBODIMENTS

Figure 1:
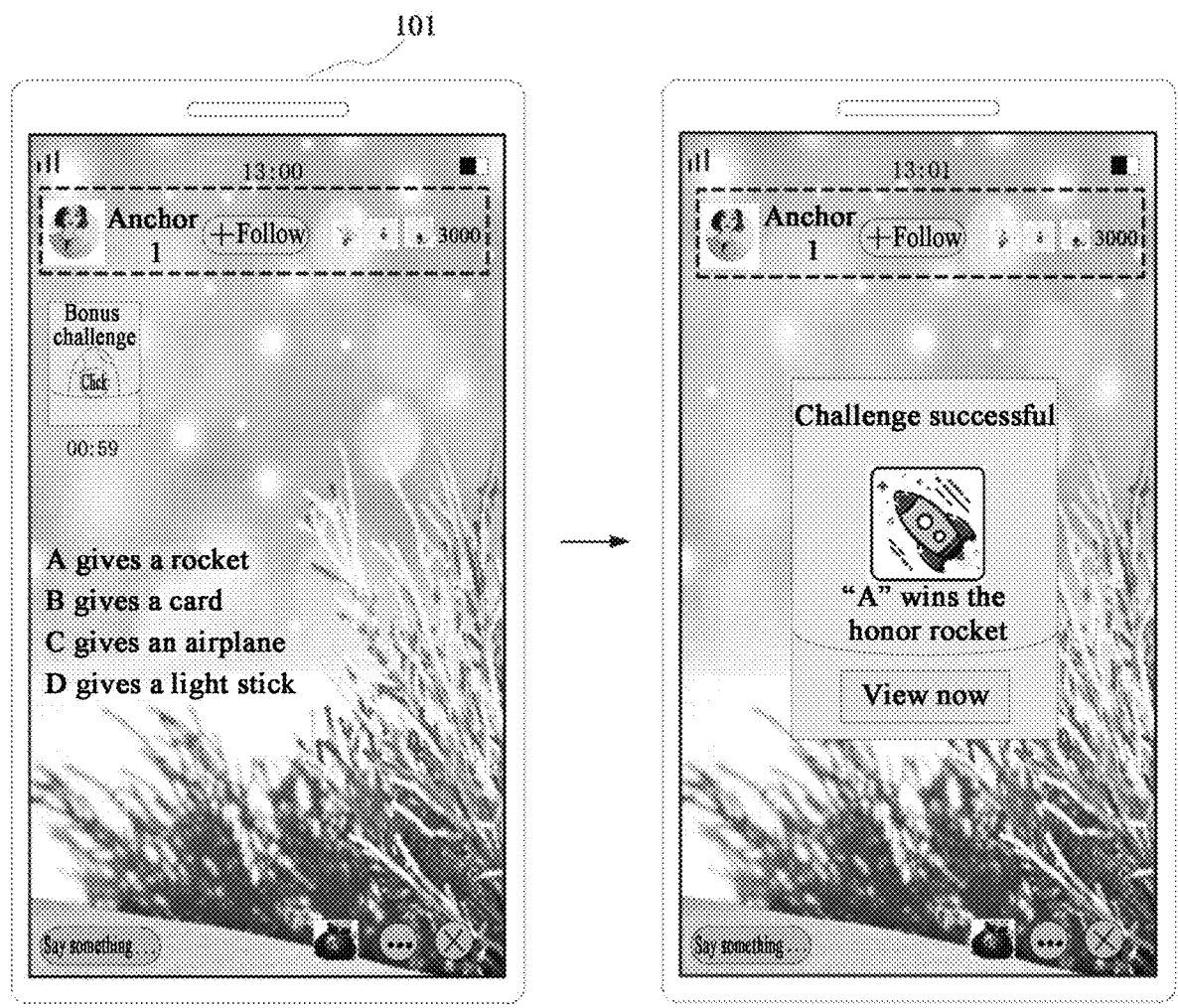
FIG. 1 illustrates a schematic diagram of an application scenario provided by embodiments of the present disclosure.

For a clearer understanding of objectives, technical solution and advantages of the embodiments of the present disclosure, the technical solution in the embodiments of the present disclosure is to be described clearly and completely below with reference to the drawings in the embodiments of the present disclosure. Apparently, the described embodiments are just a part of the embodiments of the present disclosure, rather than all of them. Embodiments of the present disclosure are obtained by those skilled in the art without any exercises of inventive work.

In the related art, servers may start a preset activity in a live room of an anchor to increase interactions between the anchor and the users. For example, if a contribution value of the anchor's live room is greater than a preset value, it indicates that the live room has a strong user contribution power, and a bonus activity (users who get a bonus may use the limited gift skin) may be started in the anchor's live room at fixed times in the next day. However, if the preset activity is started in the anchor's live room at fixed times (e.g., every hour), there is a chance that the preset activity which has been started several times may not be completed. For instance, after the preset activity has been started at the previous hour, if a large amount of users have left the live room since then, the preset activity started at this hour could not be completed. Therefore, the preset activity started in the anchor's live room may have a bad effect.

To address the technical problem in the related art, i.e., the bad effects achieved by the preset activity started in the live room, embodiments of the present disclosure provide a method for processing the livestreaming data, comprising determining history contribution values of a plurality of users watching a first livestreaming; if at least two of the plurality of users have history contribution values greater than or equal to the first threshold, obtaining follow information of the at least two users to the first livestreaming; if the follow information of the at least two users to the first livestreaming are greater than or equal to a second threshold, displaying the preset object in the livestreaming interface of the first livestreaming; after displaying the preset object in the livestreaming interface, obtaining real-time contribution values of the plurality of users to the first livestreaming with a predetermined time period; determining, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object. As such, it is flexibly and accurately determined whether the preset object is displayed in the livestreaming interface of the first livestreaming in accordance with history contribution values of the users watching the first livestreaming.

Application scenarios adapted to the present disclosure are to be described below with reference to FIG. 1.

FIG. 1 is a schematic diagram of an application scenario provided by embodiments of the present disclosure. With reference to FIG. 1, a terminal device 101 is provided. The page of the terminal device 101 is a livestreaming interface of an anchor 1. An activity icon of the bonus challenge is displayed in the livestreaming interface of the anchor 1 and the remaining time of the bonus challenge is 59 seconds. After the display of the activity icon of the bonus challenge, user A gives a rocket as the gift, user B gives a card as the gift, user C gives an airplane as the gift and user D gives a light stick as the gift.

With reference to FIG. 1, the activity of the bonus challenge ends one minute later and prompt information indicating a successful challenge is displayed in the livestreaming interface of the anchor 1, wherein the prompt information includes a message that the user A obtains an honor rocket. After obtaining the honor rocket, the user A may use a limited skin of the honor rocket gift within a valid time. Accordingly, the activity of the bonus challenge may be started flexibly in the live room of the anchor 1 in accordance with the history contribution values of the users watching the livestreaming. In such case the bonus challenge activity may be completed and the effects achieved by starting bonus challenge activity in the live room are further enhanced.

The technical solution of the present disclosure and how the technical solution of the present disclosure addresses the above technical problem are to be described in details below with reference to specific embodiments. The following specific embodiments may be combined with each other, and same or similar concepts or procedures may not be repeated in certain embodiments. Embodiments of the present disclosure are to be described below with reference to the drawings.

Figure 2:
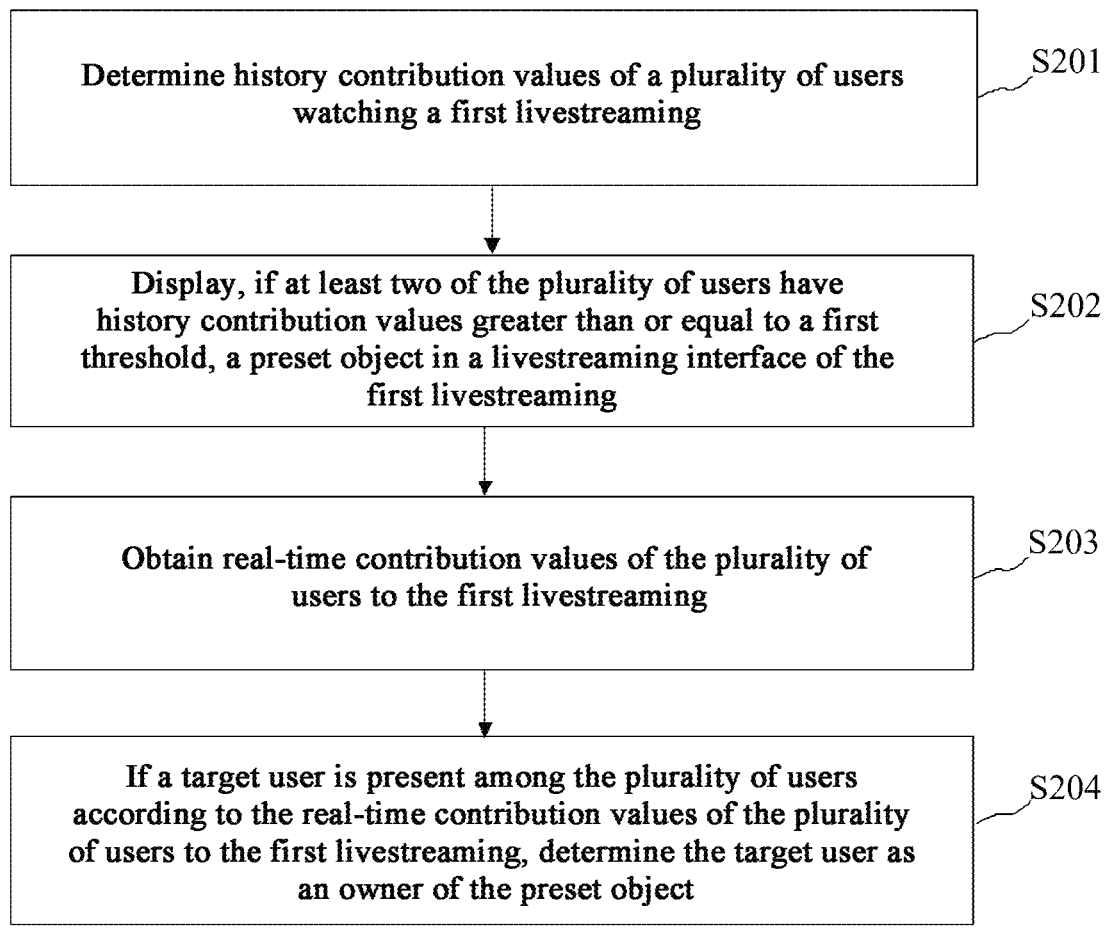
FIG. 2 illustrates a flowchart of the method for processing livestreaming data provided by embodiments of the present disclosure.

FIG. 2 is a flowchart of the method for processing livestreaming data provided by embodiments of the present disclosure. According to FIG. 2, the method may include:

S201: determining history contribution values of a plurality of users watching a first livestreaming.

The executive body of the embodiments of the present disclosure may be a server or an apparatus for processing the livestreaming data disposed in the server. The apparatus for processing the livestreaming data may be implemented by software or by the combination of software and hardware.

The first livestreaming is multimedia information played on the livestreaming interface of the anchor. For example, the first livestreaming may be video and music etc. The user may watch the first livestreaming at the livestreaming interface of the anchor. Contribution value may be interaction data between the user and the anchor. For example, the contribution value may be determined based on the interaction data, such as interaction information about a gift, a type of the gift, a number of gifts.

Optionally, for any of the plurality of users, the history contribution values of the user watching the first livestreaming may be determined according to the following feasible implementation: determining contribution values of the user to a plurality of history livestreamings. For example, in actual applications, the user may watch a plurality of livestreamings within a history period. While watching the livestreaming, the user may give gifts to a plurality of livestreamings and accordingly have corresponding contribution values in each livestreaming. Optionally, the contribution values of the user to a plurality of history livestreamings may be obtained according to the history data of the user. For example, the user watched livestreaming A, livestreaming B and livestreaming C in the past week, and the server may obtain contribution values of the user A to livestreaming A, livestreaming B and livestreaming C respectively.

An average value of the contribution values of the user to a plurality of history livestreamings is determined as the history contribution value. For example, the user watched livestreaming A, livestreaming B and livestreaming C in the past week. If the contribution value of the user to livestreaming A is 100, the contribution value of the user to livestreaming B is 300 and the contribution value of the user to livestreaming C is 500, the history contribution value of the user is 300.

S202: displaying, if at least two of the plurality of users have history contribution values greater than or equal to a first threshold, a preset object in a livestreaming interface of the first livestreaming.

The present object may be a preset bonus icon. For example, if two of a plurality of users watching the first livestreaming have history contribution values greater than or equal to the first threshold, the bonus icon is displayed in the livestreaming interface of the first livestreaming and the bonus activity accordingly starts. The user watching the first livestreaming may obtain a limited gift skin. For example, when the bonus icon is displayed on the livestreaming interface of the first livestreaming, users that complete the bonus activity may obtain the limited gift skin.

Optionally, the preset object may be displayed in the livestreaming interface of the first livestreaming through the following feasible implementation: if at least two of the plurality of users have history contribution values greater than or equal to the first threshold, obtaining follow information of the at least two users to the first livestreaming, wherein the follow information may indicate how much the user is interested in the first livestreaming. For example, the follow information may indicate how much the user is interested in the anchor of the first livestreaming and/or the livestreaming type of the first livestreaming.

If the follow information of the at least two users to the first livestreaming are greater than or equal to a second threshold, the preset object is displayed in the livestreaming interface of the first livestreaming. For example, the user had 2000 contribution values in the live rooms of five anchors within the past week. If the user had 1500 contribution values in the live room of the anchor A, the follow information of the user in the anchor A is greater than the second threshold. For example, the history contribution values of both the user A and the user B are greater than the first threshold; and the follow information of the user A in the first livestreaming is greater than the second threshold; and the follow information of the user B in the first livestreaming is also greater than the second threshold. If the user A and the user B are in the live room corresponding to the first livestreaming, the preset object may be displayed in the livestreaming interface of the first livestreaming.

Optionally, the preset object is displayed in the livestreaming interface of the first livestreaming through following feasible implementation: determining an object contribution value corresponding to the preset object. Optionally, the object contribution value is a contribution value required for completing the bonus activity. For example, if the object contribution value is 300, the users complete the bonus activity when their contribution values to the first livestreaming are 300 within a predetermined time period. Optionally, the object contribution value corresponding to the preset object is determined by the following implementation: obtaining reference information, wherein the reference information includes at least one of: history contribution values of the at least two users, an object contribution value corresponding to a history object displayed in the first history livestreaming and a maximum of real-time contribution value of the history object.

Wherein the history contribution values of the at least two users may be average contribution values of the at least two users respectively within a history time period. For instance, the history contribution value may be the average contribution value of user A in the past week and the average contribution value of user B in the last week. The object contribution value corresponding to the history object displayed in the first history livestreaming is an object contribution value corresponding to a history preset object, where the first history livestreaming and the first livestreaming have the same anchor. For example, the object contribution value corresponding to the history object displayed in the first history livestreaming may be an object contribution value corresponding to a preset object last displayed. For instance, if the bonus activity is to be started in the live room of the anchor within one hour and the bonus contribution value corresponding to the bonus activity is 400, the object contribution value corresponding to the history object displayed in the first history livestreaming is 400. The maximum of real-time contribution value of the history object may be the maximum contribution level when the history bonus activity is started. For example, in the history bonus activity, the maximum contribution value when the history bonus activity is started is 600, and the maximum real-time contribution value corresponding to the history object is 600.

The object contribution value is determined in accordance with the reference information. Optionally, the object contribution value is determined in combination with each reference information. For example, when the server starts the bonus activity, the contribution value of this bonus activity may be determined based on the contribution value of last bonus activity of the anchor. For instance, if the contribution value of the last bonus activity of the anchor is 400 and the last bonus activity has already been completed, the contribution value of this bonus activity of the anchor is 400; however, if the contribution value of the last bonus activity of the anchor is 300 and the last bonus activity was not completed, the contribution value of this bonus activity of the anchor is 200.

Optionally, the object contribution value is determined in accordance with history contribution values of at least two users. For example, the object contribution value may be determined based on an average value of the history contribution values of at least two users, or the history contribution values of one of the users. For instance, if the average contribution value of the user A within the past week is 300 and the average contribution value of the user B within the past week is 700, the object contribution value corresponding to the preset object may be determined as 500 (i.e., average value of the history contribution value of user A and the history contribution value of user B). Since the history contribution value of user B is the highest, the object contribution value corresponding to the preset object may also be determined as 700 (i.e., history contribution value of user B).

Optionally, the object contribution value is determined in accordance with the maximum real-time contribution value of the history object. For example, if the maximum real-time contribution value of the bonus activity was 700 when the last bonus activity was started in the live room of the anchor, the object contribution value of this bonus activity may be determined as 700.

The procedure of displaying the preset object in the livestreaming procedure of the first livestreaming is explained below with reference to FIG. 3.

Figure 3:
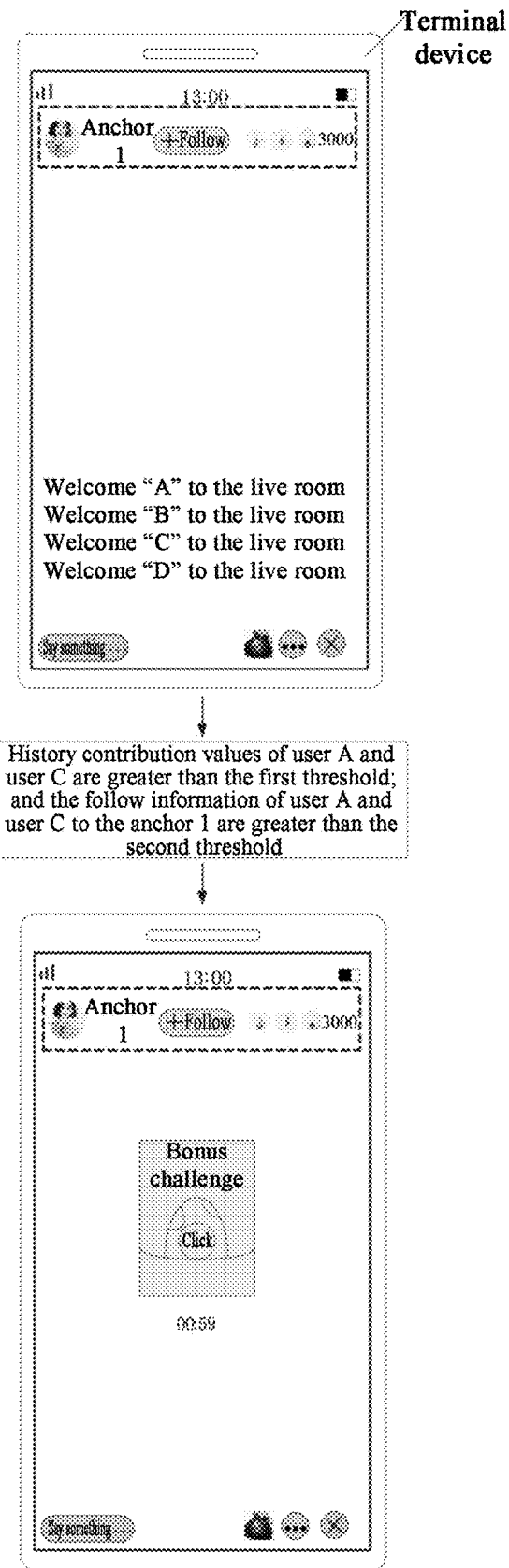
FIG. 3 illustrates a schematic diagram of displaying the preset object provided by the embodiments of the present disclosure.

FIG. 3 is a schematic diagram of displaying the preset object provided by the embodiments of the present disclosure. With reference to FIG. 3, the page of the terminal device is the livestreaming interface of the anchor 1. During the livestreaming of the anchor 1, users A, B, C and D enter the live room of the anchor 1 to watch the livestreaming.

According to FIG. 3, the history contribution values of the users A and C are greater than a first threshold, and the following information of the users A and C to the anchor 1 are greater than a second threshold. In such case, the bonus activity may be started in the live room of the anchor 1. An icon of the bonus activity is displayed in the livestreaming interface of the anchor 1 to start the bonus activity in the live room. The countdown of the bonus activity is 59 seconds. Accordingly, the server determines in real time whether the bonus activity is to be started in the live room of the anchor 1 in accordance with the history contribution values of the users watching the livestreaming of the anchor 1 and the follow information of the watching users to the anchor 1. The success rate of the completion of the bonus activity is thus improved and the effects achieved by starting bonus activities in the live room are also enhanced.

S203: obtaining real-time contribution values of the plurality of users to the first livestreaming.

The real-time contribution values are contribution values of a plurality of users to the first livestreaming after the preset object is displayed. For example, after the preset object is displayed in the livestreaming interface of the first livestreaming, the user A has a contribution value of 300 to the first livestreaming and the user B has a contribution value of 200 to the first livestreaming. Accordingly, the real-time contribution value of the user A to the first livestreaming is 300 and the real-time contribution value of the user B to the first livestreaming is 200.

Optionally, after the preset object is displayed in the livestreaming interface of the first livestreaming, the real-time contribution values of a plurality of users to the first livestreaming within a second predetermined time period are obtained. For example, after the bonus activity of the live room is started, the contribution values of a plurality of users to the live room within two minutes are obtained.

Figure 4:
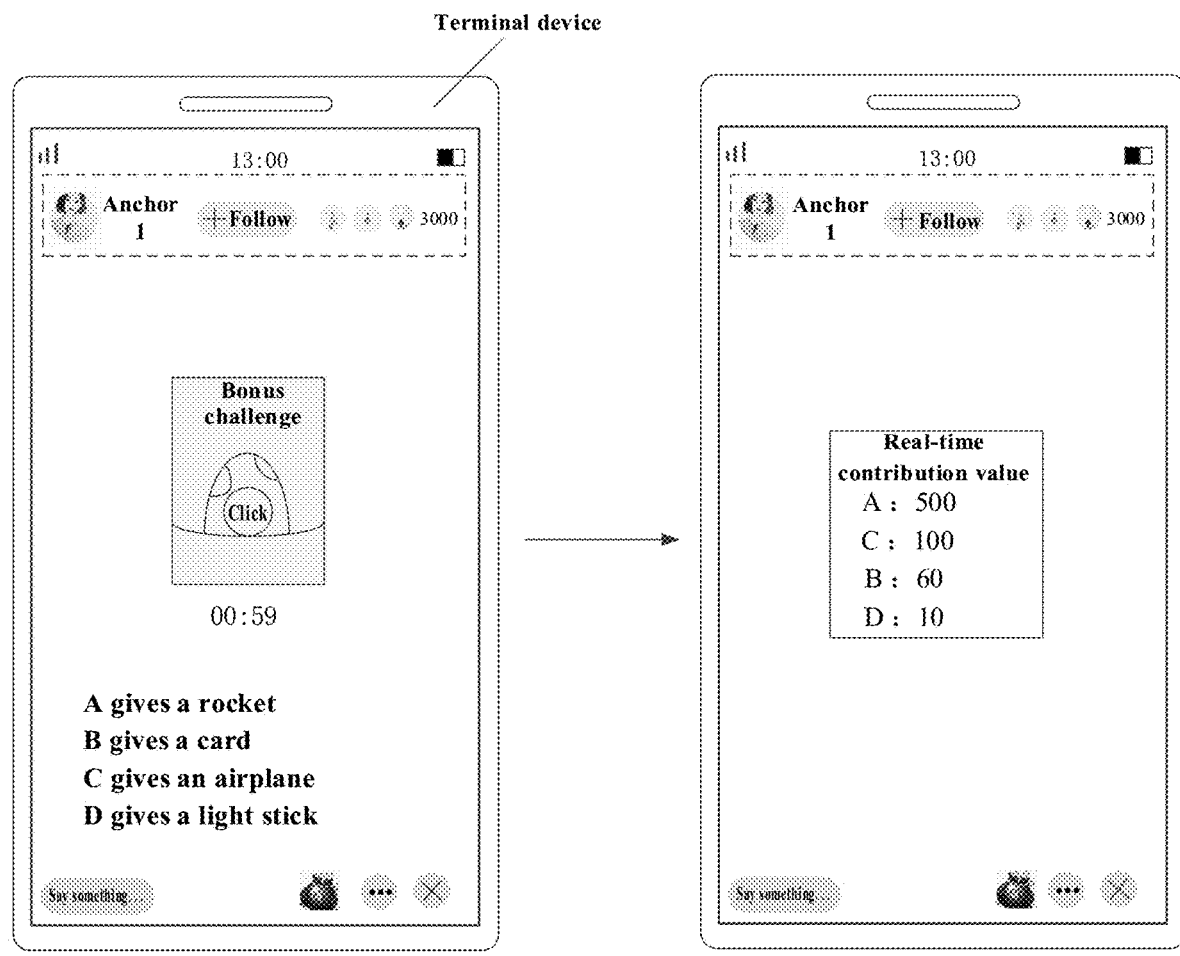
FIG. 4 illustrates a procedure of displaying the real-time contribution value provided by the embodiments of the present disclosure.

For better understanding, FIG. 4 illustrates a procedure of displaying the real-time contribution value provided by the embodiments of the present disclosure.

S204: determining, based on determining that a target user is present among the plurality of users according to the real-time contribution values of the plurality of users to the first livestreaming, the target user as an owner of the preset object.

The real-time contribution value of the target user to the first livestreaming is greater than or equal to the object contribution value corresponding to the preset object. For example, the corresponding contribution value of the bonus icon is 300. If the contribution value of the user A to the first livestreaming is 300 within two minutes from the start of the bonus activity, the user A is determined as the target user.

The target user is determined as the owner of the preset object through the following feasible implementation: obtaining real-time contribution values of a plurality of users to the first livestreaming within a predetermined time period, wherein the predetermined time period may be any time period determined in advance. For example, when the preset object is displayed in the livestreaming interface, the server may obtain the real-time contribution values of a plurality of users to the first livestreaming within one minute. It is determined whether the target user is present in the plurality of users in accordance with the real-time contribution values of a plurality of users to the first livestreaming within a predetermined time period. For example, the object contribution value corresponding to the preset object is 500. If one of a plurality of users has a real-time contribution value to the first livestreaming within one minute greater than or equal to 500, it is determined that the target user is present in the plurality of users. For instance, the object contribution value corresponding to the preset object is 500. If the user A has a real-time contribution value of 500 to the first livestreaming within one minute, the user A is determined as the target user.

If yes, the target user is determined as the owner of the preset object. For example, if the target user is present in the plurality of users, the limited gift skin corresponding the bonus activity is present to the target user, and the target user may use the limited gift skin.

Embodiments of the present disclosure provide a method for processing the livestreaming data, comprising determining history contribution values of a plurality of users watching a first livestreaming; if at least two of the plurality of users have history contribution values greater than or equal to the first threshold, obtaining follow information of the at least two users to the first livestreaming; if the follow information of the at least two users to the first livestreaming are greater than or equal to a second threshold, displaying the preset object in the livestreaming interface of the first livestreaming; obtaining real-time contribution values of the plurality of users to the first livestreaming with a predetermined time period; determining, based on determining that a target user is present among the plurality of users according to the real-time contribution values of the plurality of users to the first livestreaming, the target user as an owner of the preset object owner of the preset object. As such, a determination as to whether the preset object is displayed in the livestreaming interface of the first livestreaming is made flexibly and accurately in accordance with history contribution values of the users watching the first livestreaming. Besides, since the history contribution values of the users can effectively reflect the capability of the users to provide contribution values to the first livestreaming, the effects achieved by starting preset activities in the live room can be improved.

Figure 5:
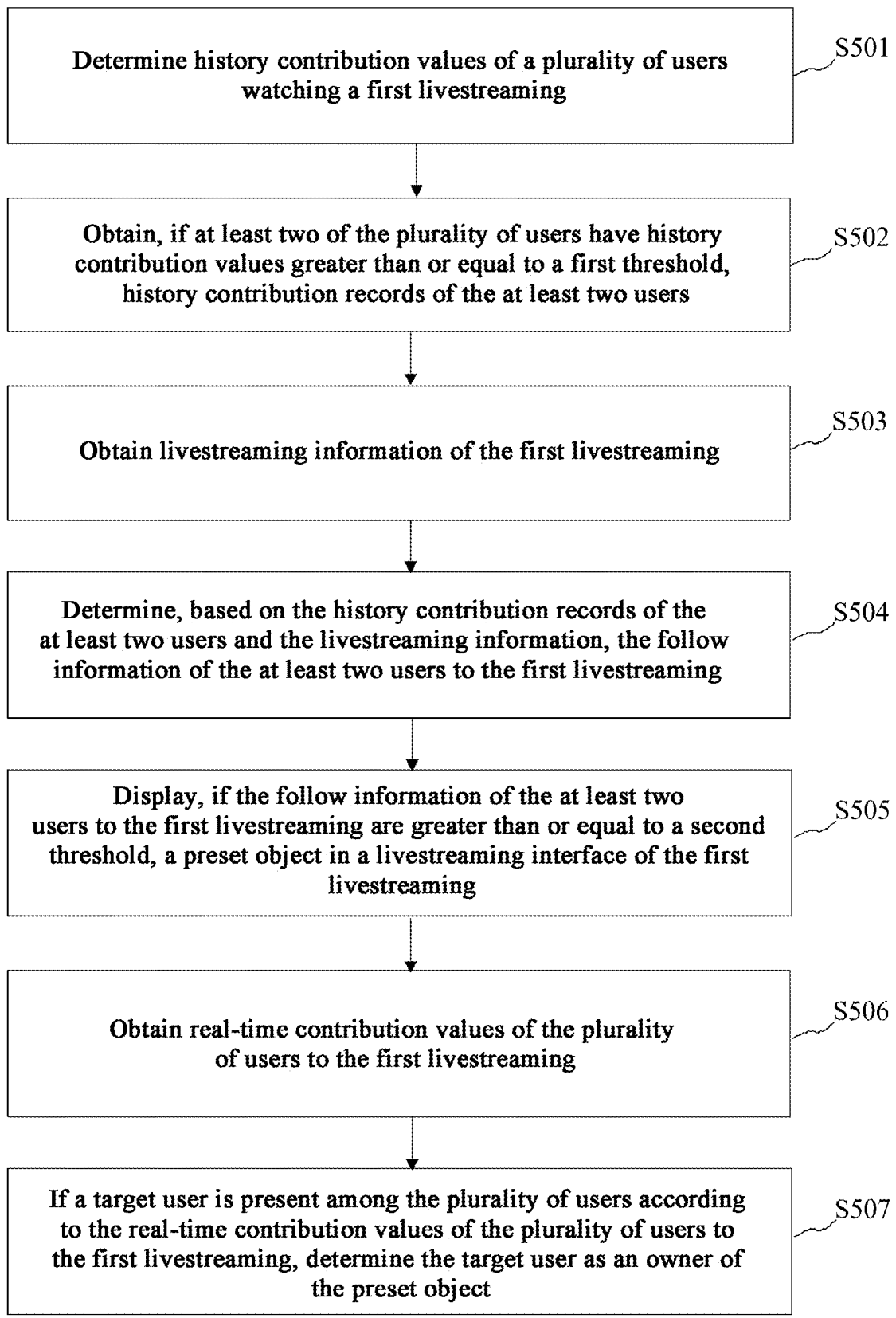
FIG. 5 illustrates a flowchart of a further method for processing the livestreaming data provided by the embodiments of the present disclosure.

On the basis of the embodiment shown by FIG. 2, the above method for processing the livestreaming data is to be described in details with reference to FIG. 5.

FIG. 5 is a flowchart of a further method for processing the livestreaming data provided by the embodiments of the present disclosure. According to FIG. 5, the method comprises:

S501: determining history contribution values of a plurality of users watching a first livestreaming.

It is to be explained that that the step S501 may be performed with reference to the above execution procedure of step S201. Embodiments of the present disclosure will not repeat the execution procedure here.

S502: obtaining, if at least two of the plurality of users have history contribution values greater than or equal to a first threshold, the history contribution records of the at least two users.

Next, one user is taken as the example to explain the history contribution record of the user in details with reference to FIG. 6 in which a diagram of the history contribution record of the user provided by the embodiments of the present disclosure is illustrated.

S503: obtaining livestreaming information of the first livestreaming.

The livestreaming information including a first livestreaming type and/or an identifier of a first anchor. For example, the livestreaming type of the first livestreaming may be game, music, beauty makeup or foods and drinks etc. For instance, the identifier of the first anchor may be name and ID information of the first anchor.

S504: determining, based on the history contribution records of the at least two users and the livestreaming information, the follow information of the at least two users to the first livestreaming.

The follow information of the at least two users to the first livestreaming may be determined through the following feasible implementation: determining, based on the history contribution records of the at least two users and the livestreaming information, a first follow information of the at least two users to a livestreaming of the first livestreaming type and a second follow information of the at least two users to the first anchor.

Optionally, the first follow information of the at least two users to the livestreaming of the first livestreaming type may be determined through the following feasible implementation: determining a first history livestreaming from the plurality of history livestreamings based on livestreaming types of the plurality of history livestreamings, wherein a livestreaming type of the first history livestreaming is the first livestreaming type. For example, the users watched livestreamings in games, foods and drinks and music in the past week. If the livestreaming type of the first livestreaming being watched by the user is games, the first history livestreaming among a plurality of history livestreamings is a livestreaming in games.

The first follow information of the at least two users to the livestreaming of the first livestreaming type is determined based on contribution values of the at least two users to the first history livestreaming.

Optionally, the contribution value of the at least two users to the first history livestreaming is proportional to the first follow information. For example, as the contribution value of the user to the first history increases, the user shows an increasingly higher follow information to the livestreaming of the first livestreaming type. Optionally, the first follow information of the at least two users to the livestreaming of the first livestreaming type may be determined in accordance with a first preset relationship between the contribution value of the user to the livestreaming type and the follow information of the user to the livestreaming type, wherein the first preset relationship includes at least one livestreaming type, the contribution value of the user to the livestreaming type and the follow information corresponding to each contribution value. For example, the first preset relationship may be indicated by Table 1 below:

TABLE 1

| Livestreaming Type | Contribution Value | Follow information |
|---|---|---|
| Games | Contribution Value 1 | Follow information 1 |
| Music | Contribution Value 2 | Follow information 2 |
| Foods and Drinks | Contribution Value 3 | Follow information 3 |
| ... | ... | ... |

It is to be explained that Table 1 only illustrates the first preset relationship by examples, rather than restricting it.

For example, if the livestreaming type of the first livestreaming is games, the follow information of the user to the first livestreaming is 1 if the contribution value of the user to the game livestreaming is 1; if the livestreaming type of the first livestreaming is music, the follow information of the user to the first livestreaming is 2 if the contribution value of the user to the music livestreaming is 2; if the livestreaming type of the first livestreaming is foods and drinks, the follow information of the user to the first livestreaming is 3 if the contribution value of the user to the foods and drinks livestreaming is 3.

Optionally, a second follow information of the at least two users to the first anchor is determined through the following feasible implementation: determining a second history livestreaming from the plurality of history livestreamings based on anchors of the plurality of history livestreamings, wherein an anchor of the second history livestreaming is the first anchor. For example, the first anchor has an identifier of ID1 and the user watched the livestreaming A, the livestreaming B and the livestreaming C within the history time period. If the anchor identifier of the livestreaming A is ID1, the anchor identifier of the livestreaming B is ID2 and the anchor identifier of the livestreaming C is ID3, the second history livestreaming is the livestreaming A. Optionally, the second history livestreaming may be one history livestreaming or a plurality of history livestreamings. For example, the user watched the livestreaming A and the livestreaming B during the history time period and the identifier of the first anchor is ID1; if both the livestreaming A and the livestreaming B have the anchor identifier of ID1, the second history livestreaming includes the livestreaming A and the livestreaming B.

The second follow information of the at least two users to the first anchor is determined based on contribution values of the at least two users to the second history livestreaming. Optionally, the contribution value of the user to the second history livestreaming is proportional to the second follow information of the user to the first anchor. As an example, for one user, the contribution value of the user to the second history livestreaming is the contribution value of the user to the first anchor. For instance, the second history livestreaming includes the livestreamings A, B and C of the anchor A. If the contribution value of the user to the livestreaming A is 100, to the livestreaming B is 300 and to the livestreaming C is 600, the contribution value of the user to the second history livestreaming is 1000.

Optionally, the second follow information of the at least two users to the first anchor may be determined in accordance with the second preset relationship between the contribution value of the user to the anchor and the follow information of the user to the anchor, wherein the second preset relationship includes at least one anchor, the contribution value of the user to the first anchor and the follow information corresponding to each contribution value. For example, the second preset relationship may be shown by FIG. 2:

TABLE 2

| Anchor | Contribution Value | Follow information |
|---|---|---|
| Anchor 1 | Contribution Value 1 | Follow information 1 |
| Anchor 2 | Contribution Value 2 | Follow information 2 |
| Anchor 3 | Contribution Value 3 | Follow information 3 |
| ... | ... | ... |

It is to be explained that Table 2 only illustrates the second preset relationship by examples, rather than restricting it.

For example, if the first anchor is anchor 1, the follow information of the user to the first anchor is 1 if the contribution value of the user to the anchor 1 is 1; if the first anchor is anchor 2, the follow information of the user to the first anchor is 2 if the contribution value of the user to the anchor 2 is 2; if the first anchor is anchor 3, the follow information of the user to the first anchor is 3 if the contribution value of the user to the anchor 3 is 3. Optionally, when the same anchor corresponds to different contribution values, the follow information of the user to the anchor may differ.

Optionally, the second follow information of the user to the first anchor may also be determined through a proportion of the contribution value of the user to the first anchor in all contribution values of the user.

The follow information of the at least two users to the first livestreaming are determined based on the first follow information and/or the second follow information. Optionally, the first follow information may be determined as the follow information of the user to the first livestreaming, and the second follow information may also be determined as the follow information of the user to the first livestreaming. Moreover, an average value of the first follow information and the second follow information may also be determined as the follow information of the user to the first livestreaming.

S505: displaying, if the follow information of the at least two users to the first livestreaming are greater than or equal to a second threshold, a preset object in a livestreaming interface of the first livestreaming.

It is to be explained that that the step S505 may be performed with reference to the above execution procedure of step S202. Embodiments of the present disclosure will not repeat the execution procedure here.

S506: obtaining real-time contribution values of the plurality of users to the first livestreaming.

Figure 7:
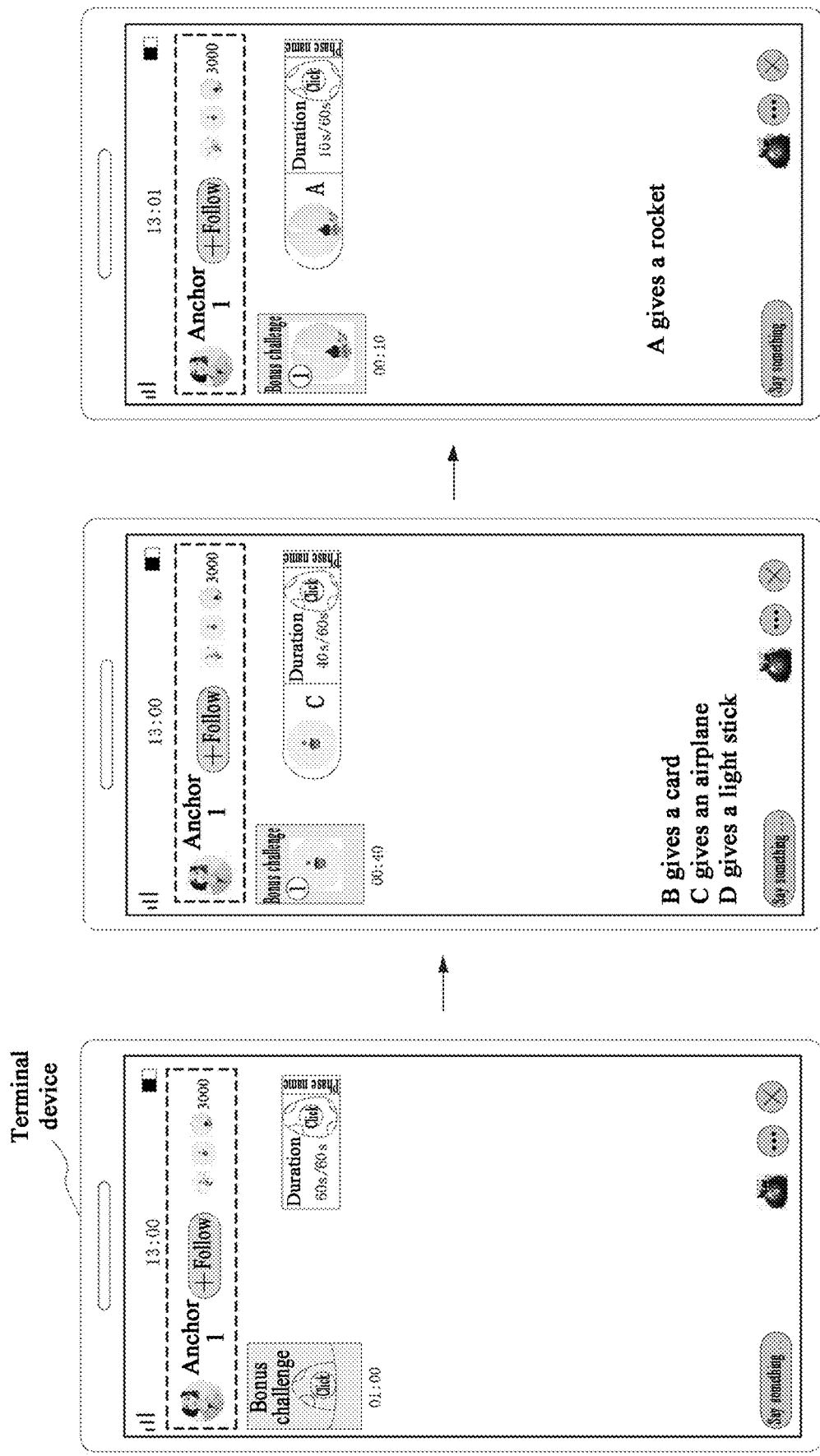
FIG. 7 illustrates a schematic diagram of the display procedure of the real-time contribution values provided by the embodiments of the present disclosure.
Figure 8:
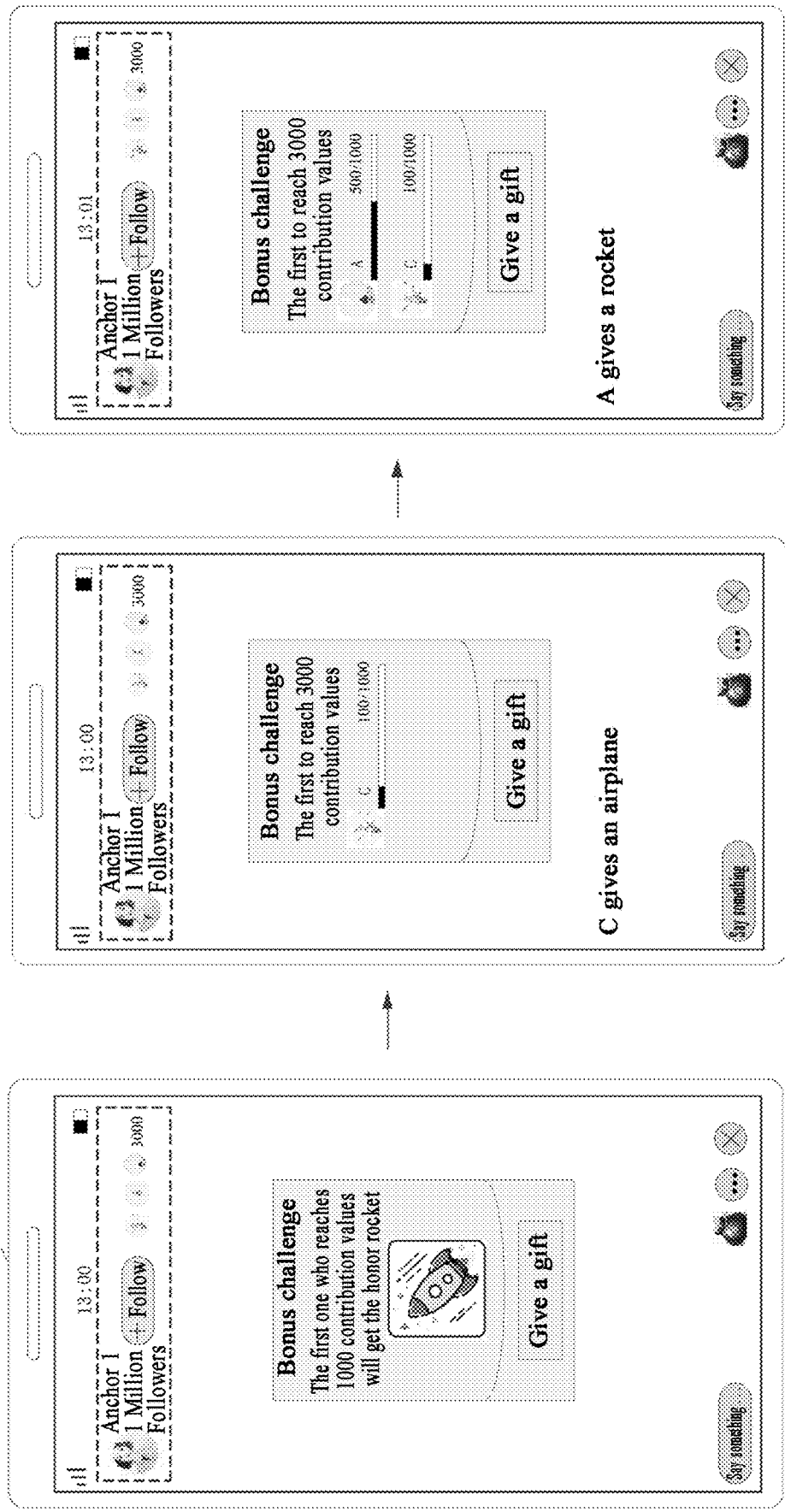
FIG. 8 illustrates a schematic diagram of a further display procedure of the real-time contribution values provided by the embodiments of the present disclosure.

Optionally, when the real-time contribution values of the plurality of users to the first livestreaming are obtained, the display page of the terminal device may also change. The change of the page in the terminal device of the anchor differs from the change of the page in the terminal device of the user. The procedure of the change of the page in the terminal device of the anchor is shown in FIG. 7. The procedure of the change of the page in the terminal device of the user is shown in FIG. 8.

Figure 9:
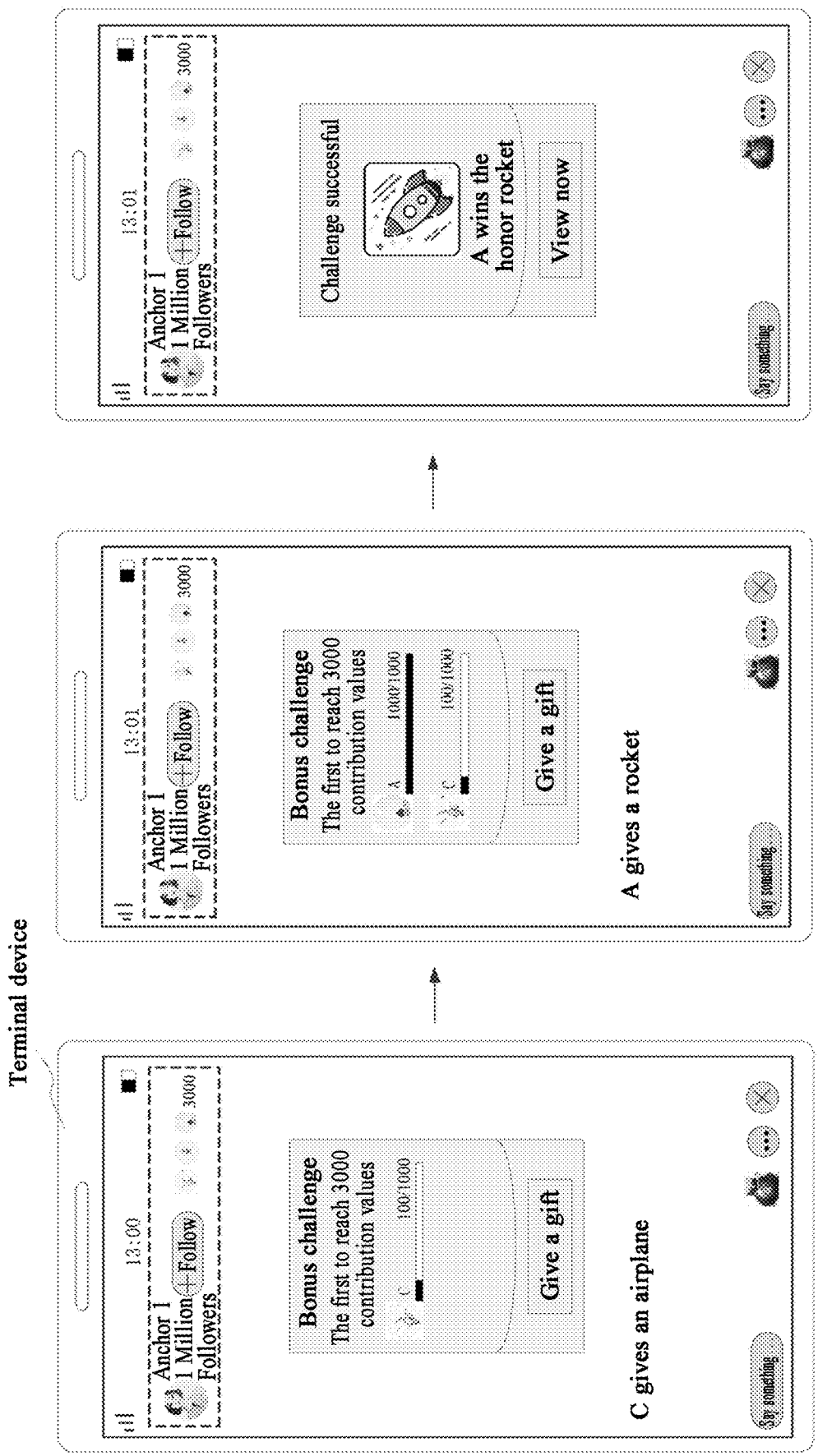
FIG. 9 illustrates a schematic diagram of the procedure of the bonus challenge provided by the embodiments of the present disclosure.

S507: determining, based on determining that a target user is present among the plurality of users according to the real-time contribution values of the plurality of users to the first livestreaming, the target user as an owner of the preset object. The completion procedure is shown in FIG. 9.

Embodiments of the present disclosure provide a method for processing the livestreaming data, comprising determining history contribution values of a plurality of users watching a first livestreaming; if at least two of the plurality of users have history contribution values greater than or equal to the first threshold, obtaining follow information of the at least two users to the first livestreaming; obtaining the livestreaming information of the first livestreaming; determining, based on the history contribution records of the at least two users and the livestreaming information, the follow information of the at least two users to the first livestreaming; if the follow information of the at least two users to the first livestreaming are greater than or equal to a second threshold, displaying the preset object in the livestreaming interface of the first livestreaming; obtaining real-time contribution values of the plurality of users to the first livestreaming with a predetermined time period; determining, based on determining that a target user is present among the plurality of users according to the real-time contribution values of the plurality of users to the first livestreaming, the target user as an owner of the preset object owner of the preset object. As such, a determination as to whether the preset object is displayed in the livestreaming interface of the first livestreaming is made flexibly and accurately in accordance with history contribution values of the users watching the first livestreaming. Meanwhile, the progress of the bonus challenge activity may be displayed to the users in real time when the bonus challenge activity is started, such that the user may timely adjust the strategy to increase the completion rate of the bonus challenge activity. Besides, since the history contribution values of the users can effectively reflect the capability of the users to provide contribution values to the first livestreaming, the effects achieved by starting preset activities in the live room can be improved.

On the basis of any of the above embodiments, the procedure of the above method for processing livestreaming data is explained in details below with reference to FIG. 10.

Figure 10:
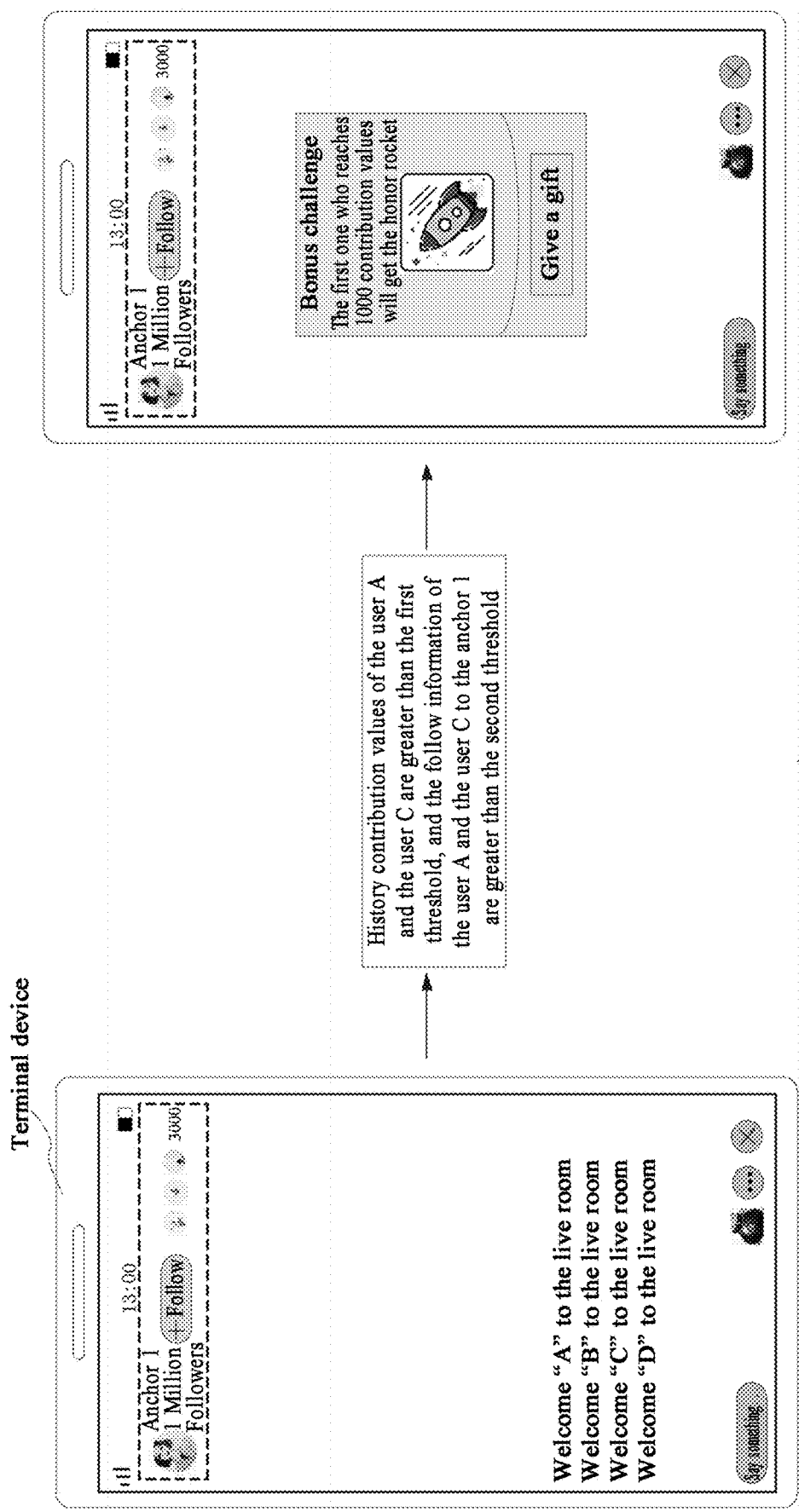
FIG. 10 illustrates a flowchart of the method for processing livestreaming data provided by the embodiments of the present disclosure.
Figure 10:
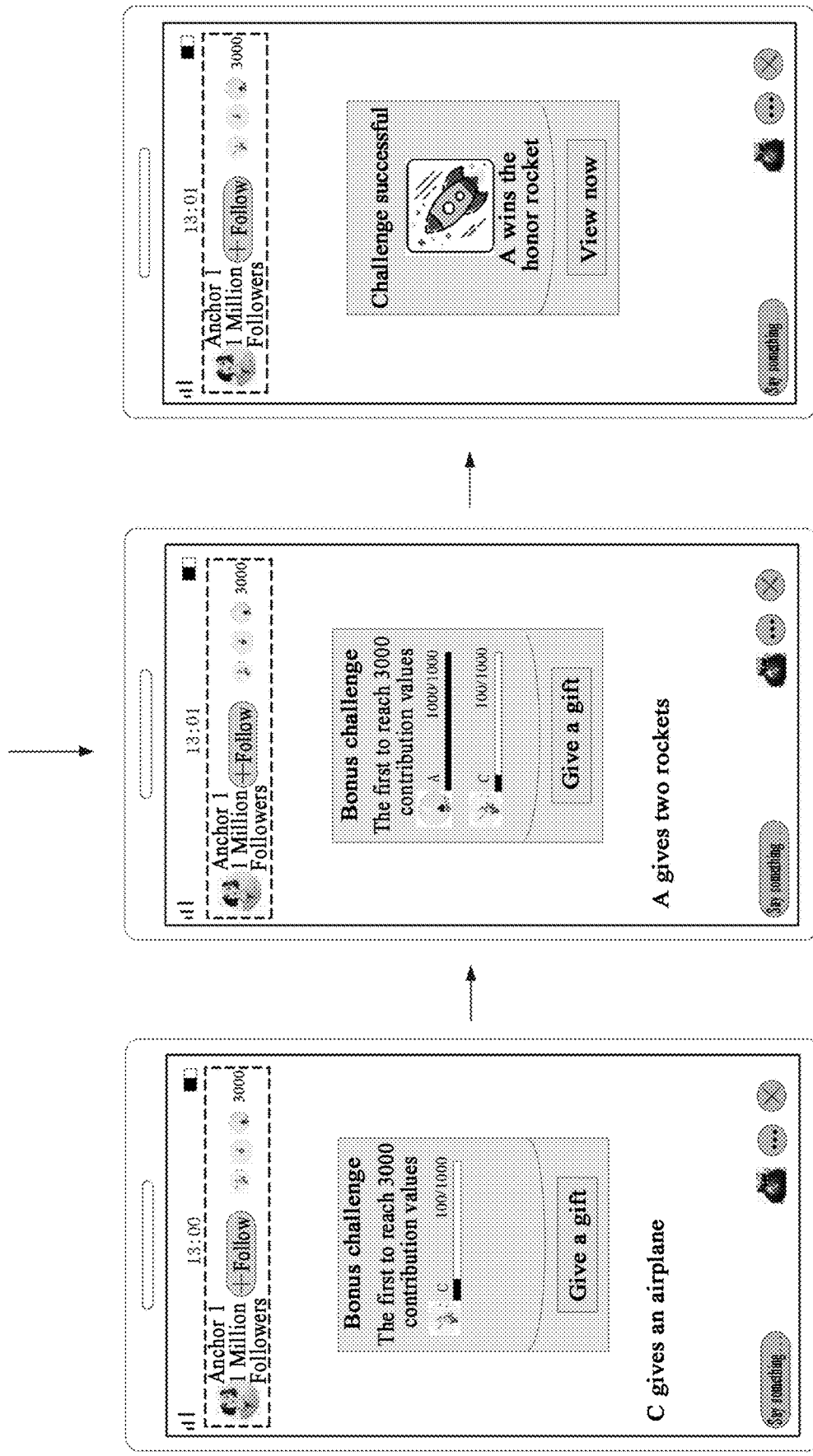

FIG. 10 is a flowchart of the method for processing livestreaming data provided by the embodiments of the present disclosure.

With reference to FIG. 10, since the user A gives the gifts worthy of 1000 contribution values during the bonus challenge activity, the user A completes the bonus challenge activity. In the livestreaming interface of the anchor 1, a message is displayed indicating success of the bonus challenge activity. In addition, all users in the live room are notified that this bonus challenge activity is completed by the user A, and the user A gains the limited skin of the rocket. As such, a determination as to whether the preset object is displayed in the livestreaming interface of the first livestreaming is made flexibly and accurately in accordance with history contribution values of the users watching the first livestreaming. Besides, since the history contribution values of the users can effectively reflect the capability of the users to provide contribution values to the first livestreaming. Therefore, the effects achieved by starting preset activities in the live room can be improved.

Figure 11:
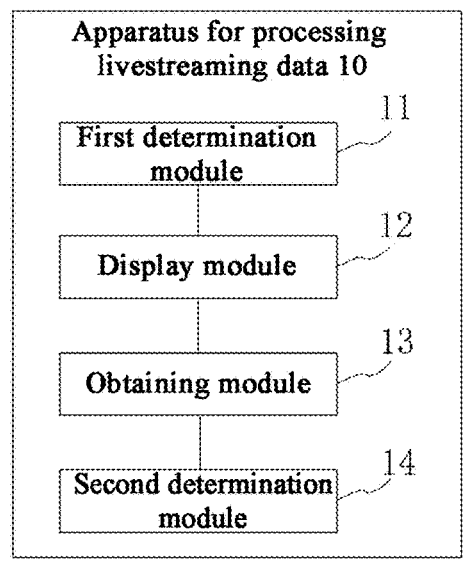
FIG. 11 illustrates a structural diagram of the apparatus for processing livestreaming data provided by the embodiments of the present disclosure.

FIG. 11 is a structural diagram of the apparatus for processing livestreaming data provided by the embodiments of the present disclosure. According to FIG. 11, the apparatus 10 for processing livestreaming data includes a first determination module 11, a display module 12, an obtaining module 13 and a second determination module 14, wherein:

The first determination module 11 is configured to determine history contribution values of a plurality of users watching a first livestreaming;

The display module 12 is configured to display, if at least two of the plurality of users have history contribution values greater than or equal to a first threshold, a preset object in a livestreaming interface of the first livestreaming;

The obtaining module 13 is configured to obtain real-time contribution values of the plurality of users to the first livestreaming; and The second determination module 14 is configured to determine, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object.

In one possible implementation, the display module 12 is specifically provided for:
if at least two of the plurality of users have history contribution values greater than or equal to the first threshold, obtaining follow information of the at least two users to the first livestreaming; and
if the follow information of the at least two users to the first livestreaming are greater than or equal to a second threshold, displaying the preset object in the livestreaming interface of the first livestreaming.

In one possible implementation, the display module 12 is specifically provided for:
obtaining history contribution records of the at least two users, wherein the history contribution records include contribution values of the at least two users to a plurality of history livestreamings, livestreaming types of the plurality of history livestreamings and anchors of the plurality of history livestreamings;
obtaining livestreaming information of the first livestreaming, the livestreaming information including a first livestreaming type and/or an identifier of a first anchor; and determining, based on the history contribution records of the at least two users and
the livestreaming information, the follow information of the at least two users to the first livestreaming.

In one possible implementation, the display module 12 is specifically provided for:
determining, based on the history contribution records of the at least two users and the livestreaming information, a first follow information of the at least two users to a livestreaming of the first livestreaming type and a second follow information of the at least two users to the first anchor; and
determining, based on the first follow information and/or the second follow information, the follow information of the at least two users to the first livestreaming.

In one possible implementation, the display module 12 is specifically provided for:
determining a first history livestreaming from the plurality of history livestreamings based on livestreaming types of the plurality of history livestreamings, wherein a livestreaming type of the first history livestreaming is the first livestreaming type; and
determining, based on contribution values of the at least two users to the first history livestreaming, the first follow information of the at least two users to the livestreaming of the first livestreaming type.

In one possible implementation, the display module 12 is specifically provided for:
determining a second history livestreaming from the plurality of history livestreamings based on anchors of the plurality of history livestreamings, wherein an anchor of the second history livestreaming is the first anchor; and determining, based on contribution values of the at least two users to the second history livestreaming, the second follow information of the at least two users to the first anchor.

In one possible implementation, the display module 12 is specifically provided for:
determining the object contribution value corresponding to the preset object; and
displaying the preset object in the livestreaming interface based on the object contribution value, the preset object including the object contribution value.

In one possible implementation, the display module 12 is specifically provided for:
obtaining reference information including at least one of: history contribution values of the at least two users, an object contribution value corresponding to a history object displayed in the first history livestreaming, a maximum of real-time contribution value of the history object, or the first history livestreaming and the first livestreaming having the same anchor; and
determining the object contribution value based on the reference information.

In one possible implementation, the first determination module 11 is specifically used for:
determining contribution values of the user to a plurality of history livestreamings; and
determining an average of the contribution values of the user to the plurality of history livestreamings as the history contribution value.

In one possible implementation, the second determination module 14 is specifically used for:
obtaining contribution values of the plurality of users to the first livestreaming within a predetermined time period;
determining, based on the contribution values of the plurality of users to the first livestreaming within the predetermined time period, whether the target user is present among the plurality of users; and
based on determining that the target user is present among the plurality of users, determining the target user as the owner of the preset object.

The apparatus for processing livestreaming data provided by this embodiment may be used to perform the above technical solution according to the method embodiment. The implementation principle and the technical effect of the apparatus are similar to those for the method and will not be repeated in this embodiment.

Figure 12:
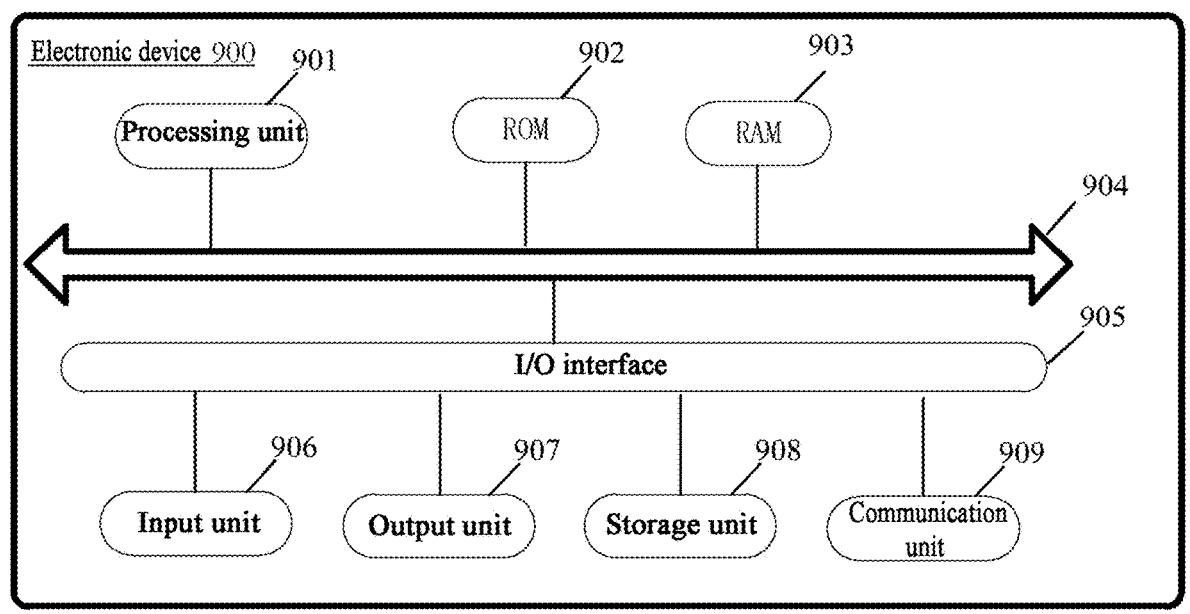
FIG. 12 illustrates a structural diagram of an electronic device provided by the embodiments of the present disclosure.

FIG. 12 is a structural diagram of an electronic device provided by the embodiments of the present disclosure. With reference to FIG. 12, a structural diagram of an electronic device 900 adapted to implement embodiments of the present disclosure is shown. The electronic device 900 may be a terminal device or a server, wherein the terminal device may include, but not limited to, mobile terminals, such as mobile phones, notebooks, digital broadcast receivers, Personal Digital Assistant (PDA), Portable Android Device (PAD), Portable Multimedia Player (PMP) and vehicle terminals (such as car navigation terminal) and fixed terminals, e.g., digital TVs and desktop computers etc. The electronic device shown in FIG. 12 is just an example and will not put any restrictions on the functions and application ranges of the embodiments of the present disclosure.

According to FIG. 12, the electronic device 900 may include a processing unit (e.g., central processor, graphic processor and the like) 901, which can execute various suitable actions and processing based on the programs stored in the read-only memory (ROM) 902 or programs loaded in the random-access memory (RAM) 903 from a storage unit 908. The RAM 903 can also store all kinds of programs and data required by the operations of the electronic device 900. Processing unit 901, ROM 902 and RAM 903 are connected to each other via a bus 904. The input/output (I/O) interface 905 is also connected to the bus 904.

Usually, input unit 906 (including touch screen, touchpad, keyboard, mouse, camera, microphone, accelerometer, gyroscope and like) and output unit 907 (including liquid crystal display (LCD), speaker and vibrator etc.), storage unit 908 (including tape and hard disk etc.) and communication unit 909 may be connected to the I/O interface 905. The communication unit 909 may allow the electronic device 900 to exchange data with other devices through wired or wireless communications. Although FIG. 12 illustrates the electronic device 900 having various units, it is to be understood that it is not a prerequisite to implement or provide all illustrated units. Alternatively, more or less units may be implemented or provided.

In particular, in accordance with embodiments of the present disclosure, the process depicted above with reference to the flowchart may be implemented as computer software programs. For example, the embodiments of the present disclosure include a computer program product including computer programs carried on a computer readable medium, wherein the computer programs include program codes for executing the method demonstrated by the flowchart. In these embodiments, the computer programs may be loaded and installed from networks via the communication unit 909, or installed from the storage unit 908, or installed from the ROM 902. The computer programs, when executed by the processing unit 901, performs the above functions defined in the method according to the embodiments of the present disclosure.

It is to be explained the above disclosed computer readable medium may be computer readable signal medium or computer readable storage medium or any combinations thereof. The computer readable storage medium for example may include, but not limited to, electric, magnetic, optical, electromagnetic, infrared or semiconductor systems, apparatus or devices or any combinations thereof. Specific examples of the computer readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof. In the present disclosure, the computer readable storage medium may be any tangible medium that contains or stores programs. The programs may be utilized by instruction execution systems, apparatuses or devices in combination with the same. In the present disclosure, the computer readable signal medium may include a data signal propagated in baseband or as part of a carrier wave, carrying computer readable program codes therein. Such propagated data signals may take many forms, including but not limited to, electromagnetic signals, optical signals, or any suitable combinations thereof. The computer readable signal medium may also be any computer readable medium in addition to the computer readable storage medium. The computer readable signal medium may send, propagate, or transmit programs for use by or in connection with instruction execution systems, apparatuses or devices. Program codes contained on the computer readable medium may be transmitted by any suitable media, including but not limited to: electric wires, fiber optic cables and RF (radio frequency) etc., or any suitable combinations thereof.

The above computer readable medium may be included in the aforementioned electronic device or stand-alone without fitting into the electronic device.

The above computer-readable medium carriers one or more programs, where the one or more programs, when executed by the electronic device, cause the electronic device to perform the method shown by the above embodiments.

Computer program instructions for executing operations of the present disclosure are written in one or more programming languages or combinations thereof. The above programming languages include object-oriented programming languages, e.g., Java, Smalltalk, C++ and so on, and traditional procedural programming languages, such as "C" language or similar programming languages. The program codes can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider).

The flow chart and block diagram in the drawings illustrate system architecture, functions and operations that may be implemented by system, method and computer program product according to various implementations of the present disclosure. In this regard, each block in the flow chart or block diagram can represent a module, a part of program segment or code, wherein the module and the part of program segment or code include one or more executable instruction for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Units described in the embodiments of the present disclosure may be implemented by software or hardware. In some cases, the name of the unit should not be considered as the restriction over the unit per se. For example, the first obtaining unit also may be described as "a unit that obtains at least two internet protocol addresses".

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In the context of the present disclosure, machine readable medium may be tangible medium that may include or store programs for use by or in connection with instruction execution systems, apparatuses or devices. The machine readable medium may be machine readable signal medium or machine readable storage medium. The machine readable storage medium for example may include, but not limited to, electric, magnetic, optical, electromagnetic, infrared or semiconductor systems, apparatus or devices or any combinations thereof. Specific examples of the machine readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof.

In the first aspect, there is provided a method for processing livestreaming data according to one or more embodiments of the present disclosure, comprising:

determining history contribution values of a plurality of users watching a first livestreaming;

displaying, if at least two of the plurality of users have history contribution values greater than or equal to a first threshold, a preset object in a livestreaming interface of the first livestreaming;

obtaining real-time contribution values of the plurality of users to the first livestreaming; and determining, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object.

In accordance with one or more embodiments of the present disclosure, displaying, if at least two of the plurality of users have history contribution values greater than or equal to a first threshold, the preset object in the livestreaming interface of the first livestreaming, comprises:

if at least two of the plurality of users have history contribution values greater than or equal to the first threshold, obtaining follow information of the at least two users to the first livestreaming; and if the follow information of the at least two users to the first livestreaming are greater than or equal to a second threshold, displaying the preset object in the livestreaming interface of the first livestreaming.

In accordance with one or more embodiments of the present disclosure, obtaining the follow information of the at least two users to the first livestreaming comprises:

obtaining history contribution records of the at least two users, wherein the history contribution records include contribution values of the at least two users to a plurality of history livestreamings, livestreaming types of the plurality of history livestreamings and anchors of the plurality of history livestreamings;

obtaining livestreaming information of the first livestreaming, the livestreaming information including a first livestreaming type and/or an identifier of a first anchor; and determining, based on the history contribution records of the at least two users and the livestreaming information, the follow information of the at least two users to the first livestreaming.

In accordance with one or more embodiments of the present disclosure, determining, based on the history contribution records of the at least two users and the livestreaming information, the follow information of the at least two users to the first livestreaming comprises:

determining, based on the history contribution records of the at least two users and the livestreaming information, a first follow information of the at least two users to a livestreaming of the first livestreaming type and a second follow information of the at least two users to the first anchor; and determining, based on the first follow information and/or the second follow information, the follow information of the at least two users to the first livestreaming.

In accordance with one or more embodiments of the present disclosure, determining, based on the history contribution records of the at least two users and the livestreaming information, the first follow information of the at least two users to the livestreaming of the first livestreaming type comprises:

determining a first history livestreaming from the plurality of history livestreamings based on livestreaming types of the plurality of history livestreamings, wherein a livestreaming type of the first history livestreaming is the first livestreaming type; and determining, based on contribution values of the at least two users to the first history livestreaming, the first follow information of the at least two users to the livestreaming of the first livestreaming type.

In accordance with one or more embodiments of the present disclosure, determining, based on the history contribution records of the at least two users and the livestreaming information, the second follow information of the at least two users to the first anchor includes:

determining a second history livestreaming from the plurality of history livestreamings based on anchors of the plurality of history livestreamings, wherein an anchor of the second history livestreaming is the first anchor; and determining, based on contribution values of the at least two users to the second history livestreaming, the second follow information of the at least two users to the first anchor.

In accordance with one or more embodiments of the present disclosure, displaying the preset object in the livestreaming interface of the first livestreaming comprises:

determining the object contribution value corresponding to the preset object; and displaying the preset object in the livestreaming interface based on the object contribution value, the preset object including the object contribution value.

In accordance with one or more embodiments of the present disclosure, determining the object contribution value corresponding to the preset object comprises:

obtaining reference information including at least one of: history contribution values of the at least two users, an object contribution value corresponding to a history object displayed in the first history livestreaming, a maximum of real-time contribution value of the history object, or the first history livestreaming and the first livestreaming having the same anchor; and determining the object contribution value based on the reference information.

In accordance with one or more embodiments of the present disclosure, determining, for each of the plurality of users, a history contribution values of the user watching the first livestreaming comprises:

determining contribution values of the user to a plurality of history livestreamings; and determining an average of the contribution values of the user to the plurality of history livestreamings as the history contribution value.

In accordance with one or more embodiments of the present disclosure, determining, based on determining that a target user is present among the plurality of users according to the real-time contribution values of the plurality of users to the first livestreaming, the target user as an owner of the preset object, comprises:
  obtaining contribution values of the plurality of users to the first livestreaming within a predetermined time period;
  determining, based on the contribution values of the plurality of users to the first livestreaming within the predetermined time period, whether the target user is present among the plurality of users; and
  based on determining that the target user is present among the plurality of users, determining the target user as the owner of the preset object.

In a second aspect, embodiments of the present disclosure provide an apparatus for image processing. The apparatus for image processing comprises an obtaining module, a processing module and a first determination module, wherein:
  the first determination module is configured to determine history contribution values of a plurality of users watching a first livestreaming;
  the display module is configured to display, if at least two of the plurality of users have history contribution values greater than or equal to a first threshold, a preset object in a livestreaming interface of the first livestreaming;
  the obtaining module is configured to obtain real-time contribution values of the plurality of users to the first livestreaming; and
  the second determination module is configured to determine, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object.

In one possible implementation, the display module is specifically provided for:
  if at least two of the plurality of users have history contribution values greater than or equal to the first threshold, obtaining follow information of the at least two users to the first livestreaming; and
  if the follow information of the at least two users to the first livestreaming are greater than or equal to a second threshold, displaying the preset object in the livestreaming interface of the first livestreaming.

In one possible implementation, the display module is specifically provided for:
  obtaining history contribution records of the at least two users, wherein the history contribution records include contribution values of the at least two users to a plurality of history livestreamings, livestreaming types of the plurality of history livestreamings and anchors of the plurality of history livestreamings;
  obtaining livestreaming information of the first livestreaming, the livestreaming information including a first livestreaming type and/or an identifier of a first anchor; and
  determining, based on the history contribution records of the at least two users and the livestreaming information, the follow information of the at least two users to the first livestreaming.

In one possible implementation, the display module is specifically provided for:
  determining, based on the history contribution records of the at least two users and the livestreaming information, a first follow information of the at least two users to a livestreaming of the first livestreaming type and a second follow information of the at least two users to the first anchor; and
  determining, based on the first follow information and/or the second follow information, the follow information of the at least two users to the first livestreaming.

In one possible implementation, the display module is specifically provided for:
  determining a first history livestreaming from the plurality of history livestreamings based on livestreaming types of the plurality of history livestreamings, wherein a livestreaming type of the first history livestreaming is the first livestreaming type; and
  determining, based on contribution values of the at least two users to the first history livestreaming, the first follow information of the at least two users to the livestreaming of the first livestreaming type.

In one possible implementation, the display module is specifically provided for:
  determining a second history livestreaming from the plurality of history livestreamings based on anchors of the plurality of history livestreamings, wherein an anchor of the second history livestreaming is the first anchor; and
  determining, based on contribution values of the at least two users to the second history livestreaming, the second follow information of the at least two users to the first anchor.

In one possible implementation, the display module is specifically provided for: determining the object contribution value corresponding to the preset object; and
  displaying the preset object in the livestreaming interface based on the object contribution value, the preset object including the object contribution value.

In one possible implementation, the display module is specifically provided for:
  obtaining reference information including at least one of: history contribution values of the at least two users, an object contribution value corresponding to a history object displayed in the first history livestreaming, a maximum of real-time contribution value of the history object, or the first history livestreaming and the first livestreaming having the same anchor; and
  determining the object contribution value based on the reference information.

In one possible implementation, the first determination module is specifically used for:
  determining contribution values of the user to a plurality of history livestreamings; and
  determining an average of the contribution values of the user to the plurality of history livestreamings as the history contribution value.

In one possible implementation, the second determination module is specifically used for:
  obtaining contribution values of the plurality of users to the first livestreaming within a predetermined time period;
  determining, based on the contribution values of the plurality of users to the first livestreaming within the predetermined time period, whether the target user is present among the plurality of users; and based on determining that the target user is present among the plurality of users, determining the target user as the owner of the preset object.

In a third aspect, one or more embodiments of the present disclosure provide an electronic device, comprising: at least one processor and a memory storing computer-executable instructions;

wherein the at least one processor is configured to execute the computer-executable instructions stored in the memory to perform the method for processing livestreaming data according to the above first aspect and various possible designs of the first aspect.

In a fourth aspect, in accordance with one or more embodiments of the present disclosure, there is provided a computer-readable storage medium having computer-executable instructions stored therein which, when executed by a processor, implement the method for processing livestreaming data according to the above first aspect and various possible designs of the first aspect.

In a fifth aspect, in accordance with one or more embodiments of the present disclosure, there is provided a computer program product comprising a computer program which, when executed by a processor, implements the method for processing livestreaming data according to the above first aspect and various possible designs of the first aspect.

In a sixth aspect, embodiments of the present disclosure provide a computer program which, when executed by a processor, implements the method for processing livestreaming data according to the above first aspect and various possible designs of the first aspect.

Embodiments of the present disclosure provide a method for processing livestreaming data, an apparatus and a device, comprising: determining history contribution values of a plurality of users watching a first livestreaming; displaying, if at least two of the plurality of users have history contribution values greater than or equal to a first threshold, a preset object in a livestreaming interface of the first livestreaming; obtaining real-time contribution values of the plurality of users to the first livestreaming; and determining, based on determining that a target user is present among the plurality of users according to the real-time contribution values of the plurality of users to the first livestreaming, the target user as an owner of the preset object, wherein a real-time contribution value of the target user to the first livestreaming is greater than or equal to an object contribution value corresponding to the preset object. Accordingly, with reference to the history contribution values of a plurality of users watching the first livestreaming, it can be accurately determined whether the preset object is displayed in the current livestreaming interface of the first livestreaming. Besides, since the history contribution values of the users can effectively reflect the capability of the users to provide contribution values to the first livestreaming, the effects achieved by starting preset activities in the live room can be improved.

Names of the messages or information exchanged between a plurality of apparatuses in the implementations of the present disclosure are provided only for explanatory purpose, rather than restricting the scope of the messages or information.

It is to be appreciated that prior to the use of the technical solutions disclosed by various embodiments of the present disclosure, type, usage scope and application scenario of personal information involved in the present disclosure are made known to users through suitable ways in accordance with the relevant laws and regulations, to obtain user authorization.

For example, in response to receiving an active request from the users, a prompt message is sent to the users to clearly inform them that the operation requested to be executed needs to obtain and use their personal information. Accordingly, the users may voluntarily select, in accordance with the prompt message, whether to provide their personal information to software or hardware that performs operations of the technical solution, such as electronic device, application program, server or storage medium.

As an optional and non-restrictive implementation, in response to receiving an active request from the users, a prompt message is sent to the users, wherein the prompt message may be present in the form of pop-up window as an example and the prompt message may be displayed in text in the pop-up window. Besides, the pop-up window also may be provided with a select control through which the users may choose to "agree" or "disagree" the provision of personal information to the electronic device.

It should be appreciated that the above procedure for informing the users and obtaining the user authorization is only exemplary and does not restrict the implementations of the present disclosure. Other methods may also be applied to the implementations of the present disclosure as long as they comply with relevant regulations and laws.

It is to be understood that data (including but not limited to the data per se, acquisition or use of the data) involved in the technical solution should comply with corresponding laws and regulations.

The above description only explains the preferred embodiments of the present disclosure and the technical principles applied. Those skilled in the art should understand that the scope of the present disclosure is not limited to the technical solution resulted from particular combinations of the above technical features, and meanwhile should also encompass other technical solutions formed from any combinations of the above technical features or equivalent features without deviating from the above disclosed inventive concept, such as the technical solutions formed by substituting the above features with the technical features disclosed here with similar functions.

Furthermore, although the respective operations are depicted in a particular order, it should be appreciated that the operations are not required to be completed in the particular order or in succession. In some cases, multitasking or multiprocessing is also beneficial. Likewise, although the above discussion comprises some particular implementation details, they should not be interpreted as limitations over the scope of the present disclosure. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter is already described by languages specific to structural features and/or method logic acts, it is to be appreciated that the subject matter defined in the attached claims is not limited to the above described particular features or acts. On the contrary, the above described particular features and acts are only example forms for implementing the claims.

We claim:

1. A method of implementing an interaction activity in a live room, comprising:
   determining history contribution values of a plurality of users watching a first livestreaming in the live room of an anchor;

displaying a preset object in a livestreaming interface of the first livestreaming in response to determining that at least two of the plurality of users have history contribution values greater than or equal to a first threshold, wherein the preset object comprises an interface element configured to start the interaction activity in the live room;

obtaining real-time contribution values of the plurality of users to the first livestreaming, wherein the real-time contribution values comprise contribution values of the plurality of users to the first livestreaming after the preset object is displayed in the livestreaming interface; and determining a target user from the plurality of users as an owner of the preset object based on the real-time contribution values of the plurality of users, wherein a real-time contribution value of the target user to the first livestreaming is greater than or equal to an object contribution value corresponding to the preset object.

2. The method of claim 1, wherein displaying the preset object in the livestreaming interface of the first livestreaming comprises:

if at least two of the plurality of users have history contribution values greater than or equal to the first threshold, obtaining follow information of the at least two users to the first livestreaming; and if the follow information of the at least two users to the first livestreaming are greater than or equal to a second threshold, displaying the preset object in the livestreaming interface of the first livestreaming.

3. The method of claim 2, wherein obtaining the follow information of the at least two users to the first livestreaming comprises:

obtaining history contribution records of the at least two users, wherein the history contribution records comprise contribution values of the at least two users to a plurality of history livestreamings, livestreaming types of the plurality of history livestreamings and anchors of the plurality of history livestreamings;

obtaining livestreaming information of the first livestreaming, the livestreaming information including a first livestreaming type and/or an identifier of a first anchor; and determining, based on the history contribution records of the at least two users and the livestreaming information, the follow information of the at least two users to the first livestreaming.

4. The method of claim 3, wherein determining, based on the history contribution records of the at least two users and the livestreaming information, the follow information of the at least two users to the first livestreaming comprises:

determining, based on the history contribution records of the at least two users and the livestreaming information, a first follow information of the at least two users to a livestreaming of the first livestreaming type and a second follow information of the at least two users to the first anchor; and determining, based on the first follow information and/or the second follow information, the follow information of the at least two users to the first livestreaming.

5. The method of claim 4, wherein determining, based on the history contribution records of the at least two users and the livestreaming information, the first follow information of the at least two users to the livestreaming of the first livestreaming type comprises:

determining a first history livestreaming from the plurality of history livestreamings based on livestreaming types of the plurality of history livestreamings, wherein a livestreaming type of the first history livestreaming is the first livestreaming type; and determining, based on contribution values of the at least two users to the first history livestreaming, the first follow information of the at least two users to the livestreaming of the first livestreaming type.

6. The method of claim 4, wherein determining, based on the history contribution records of the at least two users and the livestreaming information, the second follow information of the at least two users to the first anchor includes:

determining a second history livestreaming from the plurality of history livestreamings based on anchors of the plurality of history livestreamings, wherein an anchor of the second history livestreaming is the first anchor; and determining, based on contribution values of the at least two users to the second history livestreaming, the second follow information of the at least two users to the first anchor.

7. The method of claim 1, wherein displaying the preset object in the livestreaming interface of the first livestreaming comprises:

determining the object contribution value corresponding to the preset object; and displaying the preset object in the livestreaming interface based on the object contribution value, the preset object including the object contribution value.

8. The method of claim 7, wherein determining the object contribution value corresponding to the preset object comprises:

obtaining reference information including at least one of: history contribution values of the at least two users, an object contribution value corresponding to a history object displayed in the first history livestreaming, a maximum of real-time contribution value of the history object, or the first history livestreaming and the first livestreaming having the same anchor; and determining the object contribution value based on the reference information.

9. The method of claim 1, wherein determining, for each of the plurality of users, a history contribution values of the user watching the first livestreaming comprises:

determining contribution values of the user to a plurality of history livestreamings; and determining an average of the contribution values of the user to the plurality of history livestreamings as the history contribution value.

10. The method of claim 1, wherein determining the target user as an owner of the preset object comprises:

obtaining contribution values of the plurality of users to the first livestreaming within a predetermined time period;

determining, based on the contribution values of the plurality of users to the first livestreaming within the predetermined time period, whether the target user is present among the plurality of users; and based on determining that the target user is present among the plurality of users, determining the target user as the owner of the preset object.

11. An electronic device comprising: a processor and a memory storing computer-executable instructions; wherein the processor is configured to execute the computer-executable instructions stored in the memory to perform operations comprising:

determining history contribution values of a plurality of users watching a first livestreaming in a live room of an anchor;

displaying a preset object in a livestreaming interface of the first livestreaming in response to determining that at least two of the plurality of users have history contribution values greater than or equal to a first threshold, wherein the preset object comprises an interface element configured to start an interaction activity in the live room;

obtaining real-time contribution values of the plurality of users to the first livestreaming, wherein the real-time contribution values comprise contribution values of the plurality of users to the first livestreaming after the preset object is displayed in the livestreaming interface; and determining a target user from the plurality of users as an owner of the preset object based on the real-time contribution values of the plurality of users, wherein a real-time contribution value of the target user to the first livestreaming is greater than or equal to an object contribution value corresponding to the preset object.

12. The electronic device of claim 11, wherein displaying the preset object in the livestreaming interface of the first livestreaming, comprises:

if at least two of the plurality of users have history contribution values greater than or equal to the first threshold, obtaining follow information of the at least two users to the first livestreaming; and if the follow information of the at least two users to the first livestreaming are greater than or equal to a second threshold, displaying the preset object in the livestreaming interface of the first livestreaming.

13. The electronic device of claim 12, wherein obtaining the follow information of the at least two users to the first livestreaming comprises:

obtaining history contribution records of the at least two users, wherein the history contribution records comprise contribution values of the at least two users to a plurality of history livestreamings, livestreaming types of the plurality of history livestreamings and anchors of the plurality of history livestreamings;

obtaining livestreaming information of the first livestreaming, the livestreaming information including a first livestreaming type and/or an identifier of a first anchor; and determining, based on the history contribution records of the at least two users and the livestreaming information, the follow information of the at least two users to the first livestreaming.

14. The electronic device of claim 13, wherein determining, based on the history contribution records of the at least two users and the livestreaming information, the follow information of the at least two users to the first livestreaming comprises:

determining, based on the history contribution records of the at least two users and the livestreaming information, a first follow information of the at least two users to a livestreaming of the first livestreaming type and a second follow information of the at least two users to the first anchor; and determining, based on the first follow information and/or the second follow information, of the follow information of the at least two users to the first livestreaming.

15. The electronic device of claim 14, wherein determining, based on the history contribution records of the at least two users and the livestreaming information, the first follow information of the at least two users to the livestreaming of the first livestreaming type comprises:

determining a first history livestreaming from the plurality of history livestreamings based on livestreaming types of the plurality of history livestreamings, wherein a livestreaming type of the first history livestreaming is the first livestreaming type; and determining, based on contribution values of the at least two users to the first history livestreaming, the first follow information of the at least two users to the livestreaming of the first livestreaming type.

16. The electronic device of claim 14, wherein determining, based on the history contribution records of the at least two users and the livestreaming information, the second follow information of the at least two users to the first anchor includes:

determining a second history livestreaming from the plurality of history livestreamings based on anchors of the plurality of history livestreamings, wherein an anchor of the second history livestreaming is the first anchor; and determining, based on contribution values of the at least two users to the second history livestreaming, the second follow information of the at least two users to the first anchor.

17. The electronic device of claim 11, wherein displaying the preset object in the livestreaming interface of the first livestreaming comprises:

determining the object contribution value corresponding to the preset object; and displaying the preset object in the livestreaming interface based on the object contribution value, the preset object including the object contribution value.

18. The electronic device of claim 17, wherein determining the object contribution value corresponding to the preset object comprises:

obtaining reference information including at least one of: history contribution values of the at least two users, an object contribution value corresponding to a history object displayed in the first history livestreaming, a maximum of real-time contribution value of the history object, or the first history livestreaming and the first livestreaming having the same anchor; and determining the object contribution value based on the reference information.

19. The electronic device of claim 11, wherein determining, for each of the plurality of users, a history contribution values of the user watching the first livestreaming comprises:

determining contribution values of the user to a plurality of history livestreamings; and determining an average of the contribution values of the user to the plurality of history livestreamings as the history contribution value.

20. A non-transitory computer-readable storage medium having computer-executable instructions stored thereon which, when executed by a processor, implement operations comprising:

determining history contribution values of a plurality of users watching a first livestreaming in a live room of an anchor;

displaying a preset object in a livestreaming interface of the first livestreaming in response to determining that at least two of the plurality of users have history contribution values greater than or equal to a first threshold, wherein the preset object comprises an interface element configured to start an interaction activity in the live room;

obtaining real-time contribution values of the plurality of users to the first livestreaming, wherein the real-time contribution values comprise contribution values of the plurality of users to the first livestreaming after the preset object is displayed in the livestreaming interface; and determining a target user from the plurality of users as an owner of the preset object based on the real-time contribution values of the plurality of users, wherein a real-time contribution value of the target user to the first livestreaming is greater than or equal to an object contribution value corresponding to the preset object.

* * * * *